United States Patent [19]

Mowery, Sr. et al.

[11] Patent Number: 5,752,654
[45] Date of Patent: May 19, 1998

[54] METHOD AND APPARATUS FOR PROVIDING SUPPLEMENTAL HEATING

[75] Inventors: James J. Mowery, Sr.; David W. Stevens, both of Stevensville, Md.

[73] Assignee: The Comfort Guardian, Inc., Stevensville, Md.

[21] Appl. No.: 612,011

[22] Filed: Mar. 4, 1996

[51] Int. Cl.⁶ .................................................. G05D 23/00
[52] U.S. Cl. ...................... 237/2 B; 236/91 F; 236/91 D
[58] Field of Search .......................... 237/2 B; 236/91 F, 236/91 D; 165/240, 242

[56] References Cited

U.S. PATENT DOCUMENTS

| | | |
|---|---|---|
| 4,574,871 | 3/1986 | Parkinson et al. |
| 4,635,445 | 1/1987 | Otsuka et al. |
| 4,997,029 | 3/1991 | Otsuka et al. |
| 5,293,755 | 3/1994 | Thomas |
| 5,367,601 | 11/1994 | Hannabery |
| 5,417,368 | 5/1995 | Jeffery et al. |

OTHER PUBLICATIONS

Technical Data Sheet–Intelligent Heat Comfort Control.
Advertisment–The York Advantage.

*Primary Examiner*—Henry A. Bennett
*Assistant Examiner*—Derek S. Boles
*Attorney, Agent, or Firm*—Cushman, Darby & Cushman IP Group of Pillsbury, Madison & Sutro LLP

[57] ABSTRACT

A heating system having a primary heat source such as a heat pump, and a supplemental heat source, such as a resistive heater, that is used to complement the heat generated by the primary heat source. Heat is generated by the entire supplemental heat source when the difference between a target temperature and the actual temperature for a space being heated exceeds an extreme predetermined threshold value. Heat is generated by a limited portion of the supplemental heat source when the difference is less than the extreme predetermined threshold value but is greater than another, less extreme, predetermined threshold value. The limited portion of the supplemental heat source is energized and de-energized as needed to generate the amount of heat necessary to achieve a duct temperature setpoint when combined with the heat from the primary heat source. The duct temperature setpoint is determined from a predetermined table of values based on the outside air temperature as indicated by the temperature of refrigerant flowing out of the outside heat exchanger. The predetermined table of values is stored in a storage device relating the duct temperature setpoint to the refrigerant temperature.

36 Claims, 8 Drawing Sheets

METHOD AND APPARATUS FOR PROVIDING SUPPLEMENTAL HEATING

BACKGROUND OF THE INVENTION

1. Field of the Invention

The present invention relates generally to a method and apparatus for heating an area to a desired temperature using primary and secondary heating sources, and more specifically, to a method for determining when the secondary heating source is to be used.

2. Related Art

Conventional heat pumps control indoor temperature using a refrigerant to transfer thermal energy between an indoor and outdoor space. By increasing and decreasing the pressure of the refrigerant, conventional heat pumps create temperature differences between the refrigerant and the surrounding air that enable transfers of thermal energy.

Figure 8:
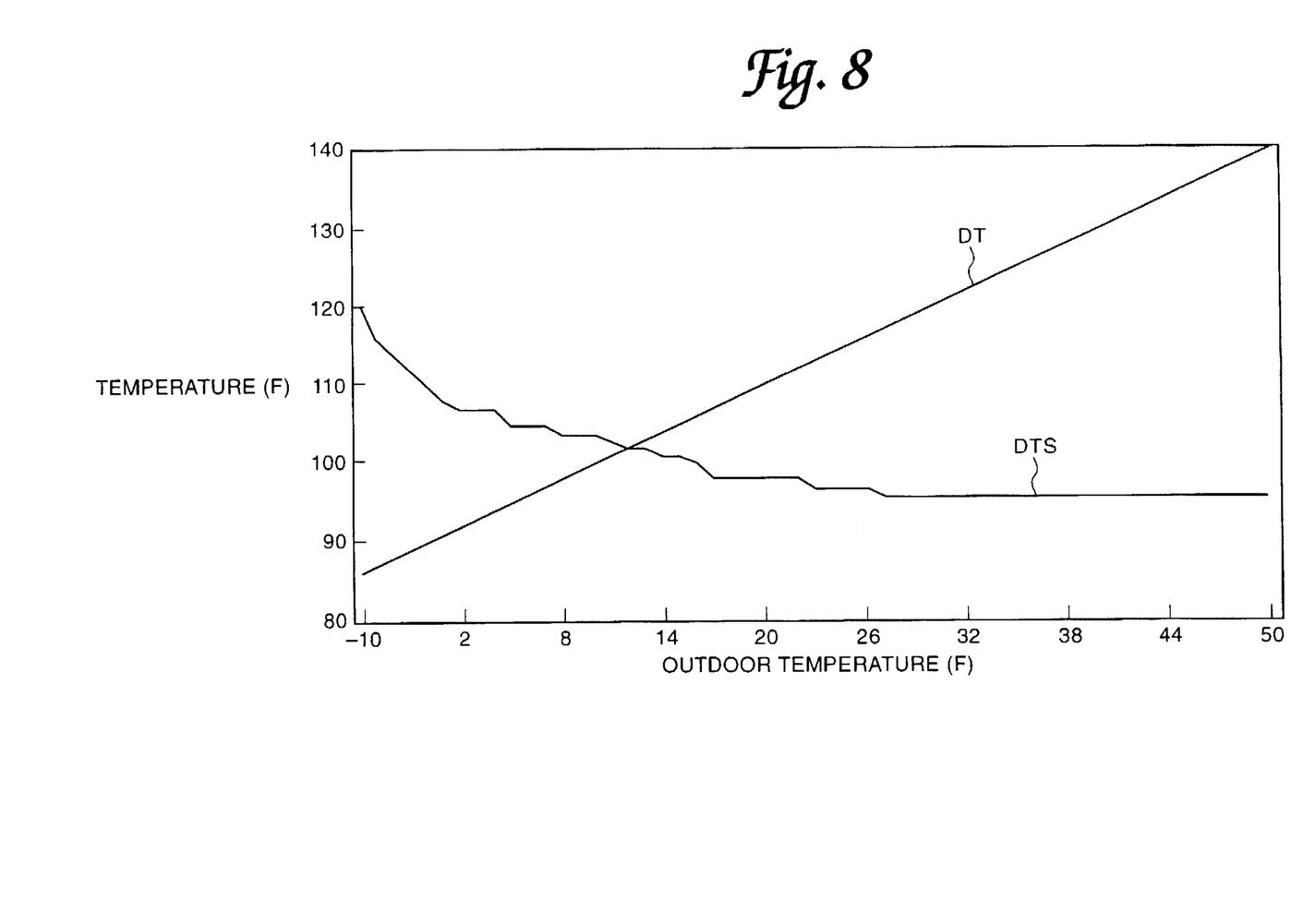
FIG. 8 is a graph showing an illustration of relationships between outdoor air temperature, outside heat exchanger refrigerant discharge temperature, and the duct air temperature setpoint.
Figure 9:
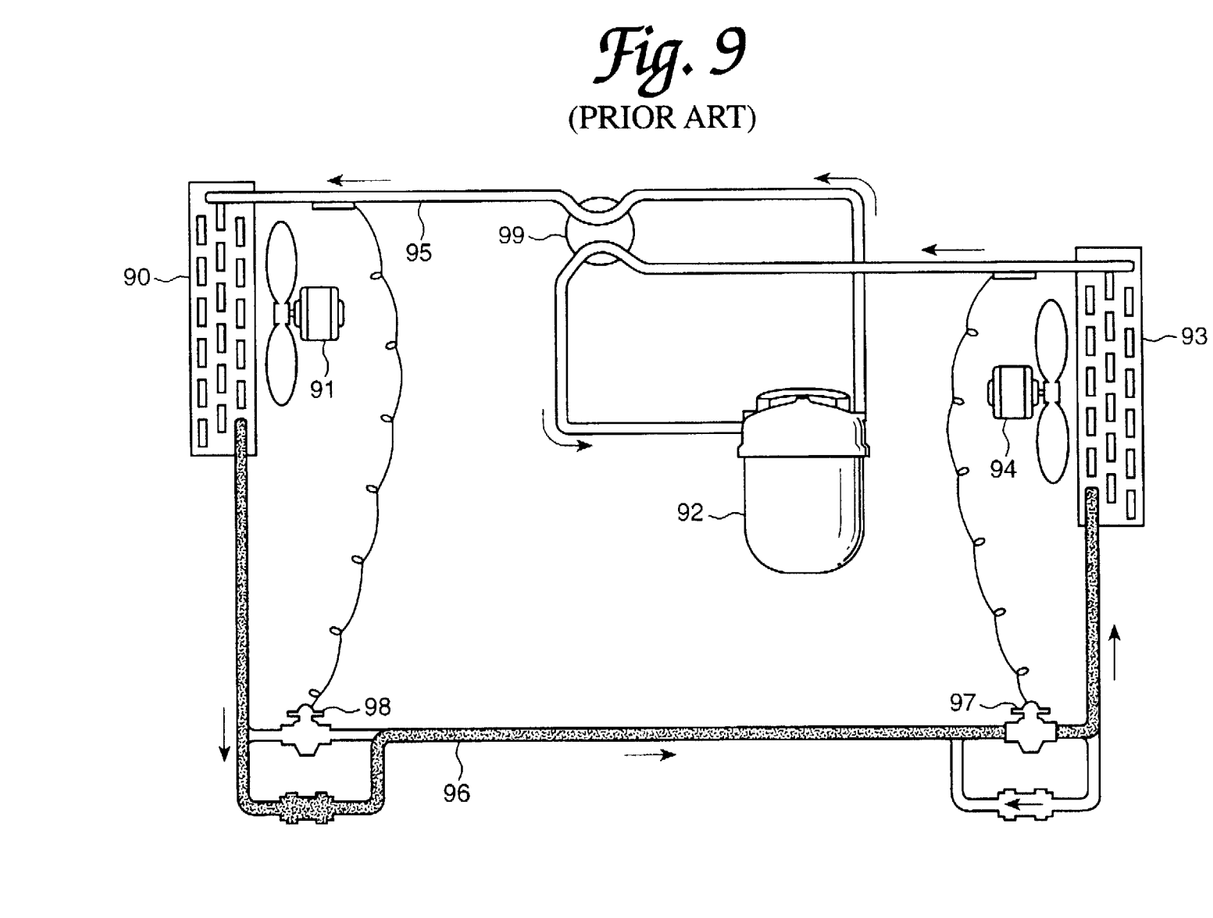
FIG. 9 is a diagram generally showing the elements of a conventional heat pump.

For instance, a conventional heat pump is shown generally in FIG. 8. The conventional heat pump includes an outdoor heat exchanger 90, outdoor blower fan 91, compressor 92, indoor heat exchanger 93, indoor blower fan 94, lines 95 and 96, pressure limiting devices 97 and 98, and reversing valve 99. A refrigerant contained within the heat pump is transferred among heat exchangers 90 and 93 via lines 95 and 96, the direction of flow being dictated by reversing valve 99.

Compressor 92 and pressure limiting devices 97 and 98 change the relative pressure of the refrigerant in each heat exchanger to create temperature differences between the refrigerant and the surrounding air. A heat exchanger with refrigerant that is highly pressurized and relatively hot will discharge thermal energy into the air surrounding the heat exchanger; a heat exchanger with refrigerant that is less pressurized and relatively cool will collect thermal energy from the air surrounding the heat exchanger.

This process is employed by the heat pump shown in FIG. 8 to cool an indoor space. In FIG. 8, pressure limiting device 97 reduces the pressure (and related temperature) of the refrigerant flowing through indoor heat exchanger 93 so that the refrigerant collects thermal energy from the air forced over indoor heat exchanger 93 by blower fan 94. Meanwhile, compressor 92 increases the pressure (and related temperature) of the refrigerant passing through outdoor heat exchanger 90 so that the refrigerant discharges the collected thermal energy to the air forced over external heat exchanger 90 by blower fan 91.

By reversing the flow of refrigerant using reversing valve 99, a heating process would be realized. In this case, pressure limiting device 98 is used in lieu of pressure limiting device 97 which is by-passed by the associated check valve. Therefore, pressure limiting device 98 reduces the pressure (and related temperature) of the refrigerant flowing through outdoor heat exchanger 90 so that the refrigerant collects thermal energy from the air forced over outdoor heat exchanger 90 by blower fan 91. Meanwhile, compressor 92 increases the pressure (and related temperature) of the refrigerant passing through indoor heat exchanger 93 so that the refrigerant discharges the collected thermal energy to the air forced over internal heat exchanger 93 by blower fan 94.

To determine whether heating or cooling is necessary, conventional heat pumps compare the actual temperature of the indoor space with a thermostat setting of the desired temperature for the occupant. When the difference exceeds a predetermined threshold value (e.g., $\pm 2°$ F.), a call for heating/cooling is initiated by the heat pump. To satisfy this call, the refrigerant is pumped through the system in the appropriate direction being compressed and decompressed as described above, and air is forced across the indoor and outdoor heat exchangers, the air passing across the indoor heat exchanger being distributed through ducts to the indoor space being heated/cooled. By virtue of its movement through the indoor heat exchanger, the air is heated/cooled appropriately.

Heat pumps are capable of providing sufficient heating/cooling so long as an adequate temperature difference exists between the refrigerant and the surrounding air to facilitate a transfer of thermal energy. However, when weather conditions are severe, conventional heat pumps are rendered incapable of transferring sufficient thermal energy to satisfy a first stage call for heating/cooling. For example, when the outside temperature is below approximately 35° F., the conventional heat pump is not capable of providing adequate heat to offset the losses caused by convection, conduction and radiation of heat from the indoor space being heated. That is, the heat pump is generally not capable of extracting the thermal energy from the outside air necessary to support the heating requirements of the indoor space.

To supplement the available heat pump output under such severe conditions, the conventional heat pump has been modified to include a supplemental heater package. In this modified heat pump, the supplemental heater package is energized only after the difference between the actual temperature of the indoor space being heated and the thermostat setting differ by more than a second predetermined threshold value (e.g., $\pm 4°$ F.), at which time the supplemental heater package is fully powered. The supplemental heater package includes multiple heaters such as resistive heaters that are positioned along the forced air path between the blower fan and the air ducts. Therefore, in response to a second stage call, the supplemental heater package provides the additional heat necessary to achieve the desired indoor air temperature before the air is forced through the ducts to the indoor space being heated.

However, supplemental heaters that are used in response to second stage calls are less efficient than heat pumps. Also, as indicated above, second stage calls have required full power to all supplemental heaters, regardless of whether less than all of those heaters are required to produce sufficient heat to achieve the desired temperature. For these reasons, excessive power is consumed during second stage calls.

Furthermore, when heating in response to second stage calls, heat pump systems generate excessive amounts of heat that result in sacrificed comfort and decreased heating efficiency. Duct air temperatures reach approximately 125° F. when the supplemental heater is fully powered; indoor temperatures are based on a thermostat setting but typically remain between 65° F. and 72° F. This significant difference between the temperature of the duct air used to heat the indoor space and the temperature of the indoor air results in air stratification. When stratification occurs, the warm supplementally heated air quickly rises to the ceiling where the temperature can be as much as 10° F. warmer than near the floor. Comfort is sacrificed since the warm air is near the ceiling, away from the occupants. Heating efficiency is decreased due to heat losses experienced when the supplementally heated air rises and creates a temperature differential across the insulation in the ceiling and along the tops of the walls of the structure.

One solution that has been proposed for this problem has been to provide a limited amount of supplemental heat in response to a first stage call when the heat pump has not been capable of producing sufficiently hot duct air in response to that first stage call. Unlike a response to a second stage call that included full and continuous power to the entire supplemental heater package, the response to a first stage call can include proportional or pulsed power to the entire supplemental heater package, or power to only a designated portion of the supplemental heater package. In any case, the amount of supplemental heat to be provided by the supplemental heater package during a first stage call has been based on the difference between the temperature of air passing through the ducts and a duct temperature setpoint. Therefore, when the duct temperature setpoint has been set appropriately for the conditions, the supplemental heater package and the heat pump have produced the precise amount of heat needed to achieve the desired temperature.

In the prior art, the duct temperature setpoint has been established based on an arbitrary value that has been decremented in response to a first stage satisfaction, and incremented in response to a second stage call. More specifically, the duct temperature setpoint has initially been set based on a default value that is arbitrary; it has not been related to the amount of thermal energy available from the heat pump. The duct temperature setpoint has been decreased in response to a first stage call because a first stage call is satisfied only when excessive heat has been provided in response to a first stage call. Likewise, the duct temperature setpoint has been increased in response to a second stage call because a second stage call for heat is initiated only when inadequate heat is provided in response to the first stage call.

Because the correct setpoint has been determined through a process of incrementally correcting an arbitrary initial setpoint over multiple iterations, delays have been experienced by the prior art when determining the correct duct temperature setpoint. Therefore, before the correct setpoint has finally been determined in the prior art, the amount of supplemental heat has been determined based on erroneous setpoints causing sacrificed efficiency and comfort.

Moreover, the prior art system has necessarily introduced error since that system is based on a feed-back control, not changing the setpoint until errors have occurred and are fed back such as the satisfaction of a first stage call when the setpoint is set too high, or the initiation of a second stage call when the setpoint is set too low.

SUMMARY OF THE INVENTION

It is an object of the present invention to improve heating efficiency and comfort by accurately determining the appropriate amount of supplemental heat to be added during a first stage call to maintain a desired room temperature.

It is an object of the present invention to conserve energy and expense by ensuring that the heating load is borne insofar as possible by the heat pump rather than by the supplemental heater.

It is an object of the present invention to adaptively change the amount of supplemental heat provided in real time based on changes in heating requirements of the indoor space.

It is an object of the present invention to make changes in the amount of supplemental heat based on a direct relationship with the outdoor conditions.

It is an object of the present invention to perform feed-forward control of a heating system, determining temperature setpoints to achieve appropriate heating based on measurable criteria using predetermined data.

These and other objects are accomplished according to the invention through a heating system and process in which indoor air is heated using a primary heat source when a difference between a target temperature and an actual temperature in the area exceeds a first predetermined threshold value. To control a supplemental heat source, a control signal is generated relative to outdoor temperature. A duct setpoint temperature for heated air flowing between the primary heat source and the area being heated is set based on the control signal.

The temperature of the heated duct air flowing between the primary heat source and the area being heated is measured, and a supplemental heat source is used to heat the air when the difference between the measured duct air temperature and the duct temperature setpoint exceeds a second predetermined threshold value.

This heating system and process is applicable to heating systems whose primary heat source is a heat pump or any conventional furnace. When a heat pump is used, an indication of outside temperature can be generated based on the temperature of refrigerant passing from an outdoor heat exchanger and an indoor heat exchanger. When a conventional furnace is used, an indication of outside temperature can be generated based on the temperature of air passing through a return air duct. In either case, the amount of heat generated by the supplemental heat source can be based on the difference between the measured duct air temperature and the duct temperature setpoint.

In this process and system, the portion of supplemental heating used to supplement the primary heat source may change based on a comparison of a third predetermined threshold value and the difference between the target temperature and the actual temperature. The third predetermined threshold value is greater than the second predetermined threshold value. When the difference is less than the third predetermined threshold value, the heat used to supplement the primary heat source is generated by only a limited portion of said supplemental heat source or at a reduced power. However, when the difference exceeds the third predetermined threshold value, the full capabilities of the supplemental heat source are used to generate heat.

Because the appropriate setpoint is determined based on measurable criteria that are related to outside temperature, the present invention determines the appropriate duct temperature setpoint immediately, or at least once the primary heat source is stable. Because the outside temperature is a primary factor in determining the amount of heat loss a structure will experience, the duct temperature setpoint is accurately established by the present invention.

Additional details and objects will be apparent from the following discussion of particular examples and embodiments.

BRIEF DESCRIPTION OF THE DRAWINGS

There are shown in the drawings certain exemplary embodiments of the invention as presently preferred. It should be understood that the invention is not limited to the embodiments disclosed as examples, and that the invention is capable of variations within the scope of the appended claims. In the drawings:

DETAILED DESCRIPTION OF THE PREFERRED EMBODIMENTS

Figure 1A:
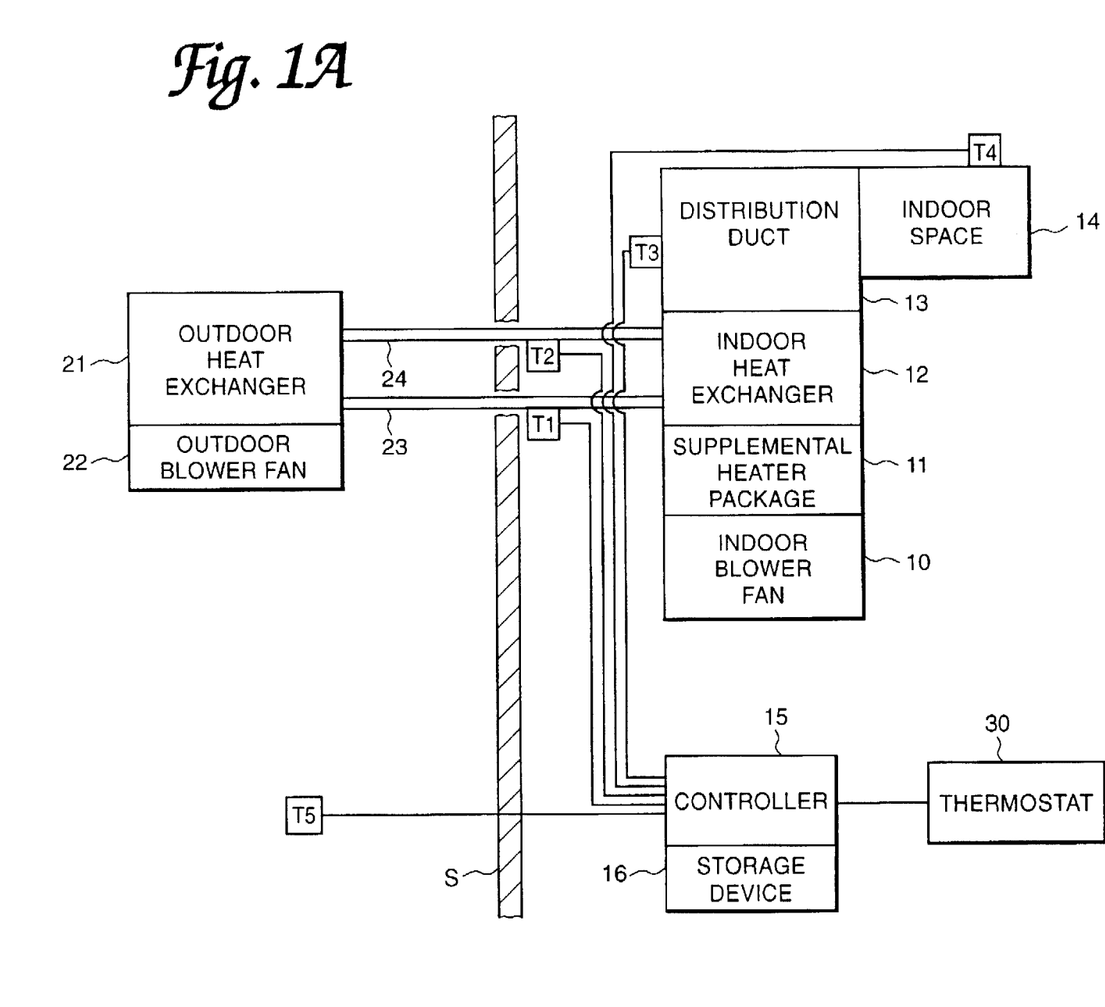
FIG. 1A is a diagram showing the elements of a heat pump system with a supplemental heat control according to the present invention.
Figure 1B:
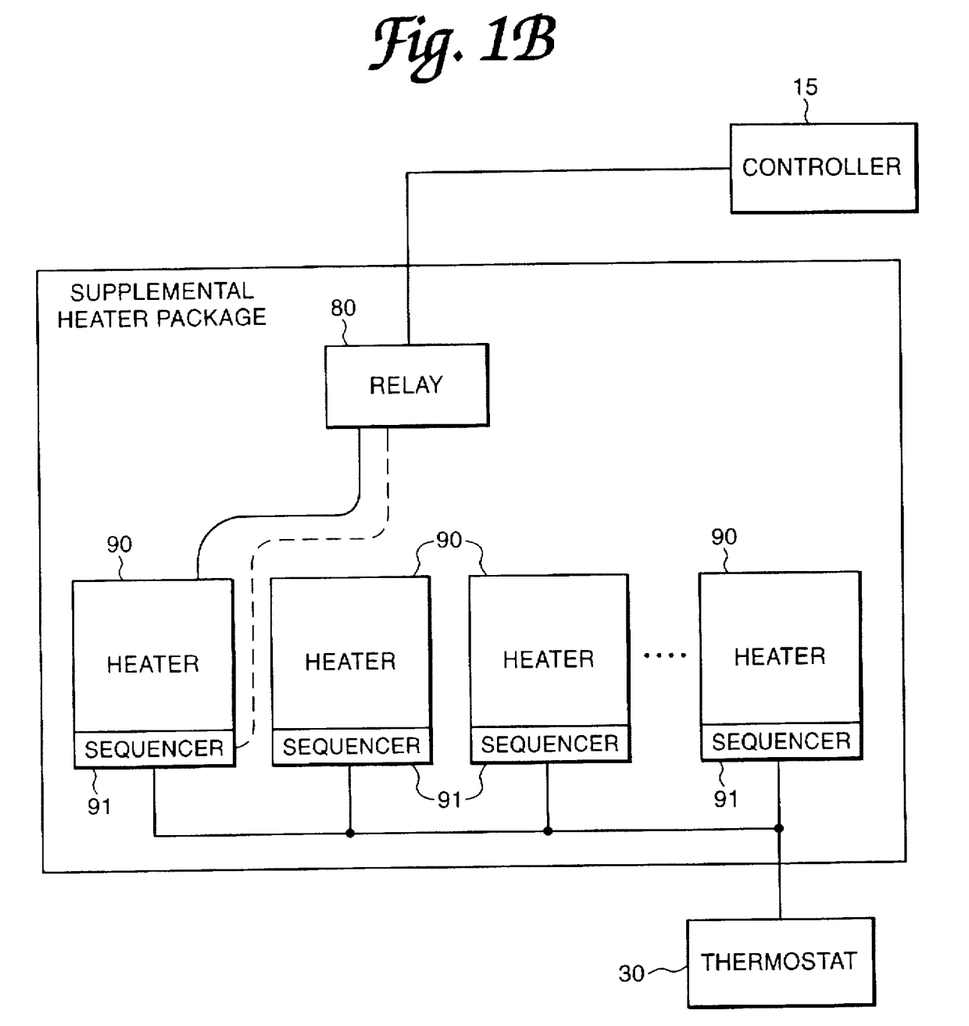
FIG. 1B is a diagram showing the elements of a supplemental heater package included within the heat pump system of FIG. 1A.

An example of a heating system according to the preferred embodiment of the present invention is generally shown in the block diagrams of FIGS. 1A and 1B. The preferred embodiment of this heating system is designed to retrofit a conventional heating systems.

As illustrated in FIG. 1A, the heating system of the present invention includes a conventional heating supply (such as the heat pump illustrated in FIG. 8), a supplemental heater package 11, a controller 15 and a memory device 16. The conventional heat pump has components located both inside and outside a structure S, the interior of which is heated by the heating system.

The portion of the heat pump located outside structure S generally includes heat exchanger 21, blower fan 22, a compressor (not shown) and appropriate valving (not shown). During heating, the pressure of the refrigerant flowing through heat exchanger 21 is reduced so that the refrigerant is cool. The cooled refrigerant absorbs thermal energy from outside air that is forced over outdoor heat exchanger 21 by outdoor blower fan 22. After absorbing thermal energy, the refrigerant is compressed.

The portion of the heat pump located within structure S generally includes heat exchanger 12, blower fan 10, appropriate valving (not shown), distribution ducts 13, thermostat 30 and conventional control circuitry (not shown). The compressed refrigerant flows through heat exchanger 12. The heated refrigerant transfers thermal energy to the inside air that is forced over indoor heat exchanger 12 by indoor blower fan 10. The heated inside air then flows through distribution duct 13 into indoor space 14 being heated.

Lines 23 and 24 are provided between the indoor and outdoor portions of the heat pump. During heating, line 23 removes refrigerant from indoor heat exchanger 12 and line 24 discharges refrigerant into indoor heat exchanger 12. As described above, the heat pump uses the refrigerant to transfer thermal energy from the outside air to the inside air during heating.

Temperature sensors are provided at various locations throughout the heating system to measure system temperatures, five of which, T1–T5, are shown in FIG. 1A. Temperature sensors T1–T2 measure temperatures of the refrigerant flowing through lines 23 and 24, respectively, temperature sensor T3 measures the temperature of air passing through distribution ducts 13, temperature sensor T4 measures the temperature of air in the indoor space 14 being heated, and temperature sensor T5 measures the temperature of outside air. Although positioned inside structure S in FIG. 1A, upstream and downstream of the heat pump compressor, temperature sensors T1 and T2 may be positioned outside structure S, measuring the temperature of the refrigerant upstream and downstream of the heat pump compressor.

Thermostat 30 is programmed by an occupant with the desired temperature for inside space 14. Thermostat 30 generates first and second stage calls for heat based on temperature differences between the inside air temperature and the desired room temperature. When the temperature difference is above a first threshold but below a second threshold greater than the first threshold, thermostat 30 generates a first stage call for heat. When the temperature difference of the indoor air is above the second threshold, thermostat 30 generates a second stage call for heat. During a first stage call for heat, a control signal generated by thermostat 30 elicits heat from only the heat pump. In contrast, during a second stage call for heat, the control signal generated by thermostat 30 elicits heat from the heat pump and from all heaters within supplemental heater package 11.

Controller 15 generates a control signal for controlling heaters 90 (see FIG. 1B) within supplemental heater package 11. However, unlike the signal generated by thermostat 30, the control signal generated by controller 15 is selectively generated in response to a first stage call for heat. Additionally, in response to the control signal generated by controller 15, supplemental heater package 11 generates only a portion of its full heating capabilities. By eliciting less than the full capabilities of the supplemental heater package during the first stage call, controller 15 provides control not available through the conventional thermostat. Controller 15 also determines appropriate temperature setpoints for activating heaters 90 within supplemental heater package 11. Storage device 16 stores data such as predetermined temperature threshold values, timing data, and a table relating various duct temperature setpoints to operating conditions.

Supplemental heater package 11 is positioned between blower fan 10 and indoor heat exchanger 12. The present invention also contemplates positioning supplemental heater package 11 at other positions so long as those positions enable supplementation of the heat provided by the exchangers of the heat pump. For instance, supplemental heater package 11 may be positioned within or around distribution duct 13, between indoor heat exchanger 12 and distribution ducts 13, around indoor heat exchanger 12, or around outdoor heat exchanger 21.

Supplemental heater package 11 supplements the heat transferred by the heat pump. As shown in FIG. 1B, supplemental heater package 11 includes multiple heaters 90 that receive input from thermostat 30, enabling full activation of all heaters 90 in response to a second stage call for heat from thermostat 30. Sequencers 91 are provided at the input of each heater 90 to prevent excessive loading. Sequencers 91 activate each heater in rapid succession when full activation of heaters 90 is requested. In addition to the input received from thermostat 30, at least heater 90 receives a control signal (e.g., pulsed signal) from a relay 80. Relay 80 is controlled by controller 15. As shown by the broken line, relay 80 may be connected directly to heater 90 or through sequencer 91. Alternatively, using the control signal from relay 80, various gradations of power may be provided to the first heater in response to a control signal from controller 15. Relay 80 may be used to control multiple heaters 90, or additional relays 80 may be added to provide graduated control over additional heaters 90 within supplemental heater package 11, enabling a ramped increase of a larger portion of supplemental heater package 11 when necessary. Alternatively, controller 15 may be connected to supplemental heater package 11 and used to control heaters 90 within supplemental heater package 11 to attain pulsed or otherwise not fully powered output from heaters 90.

Figure 2:
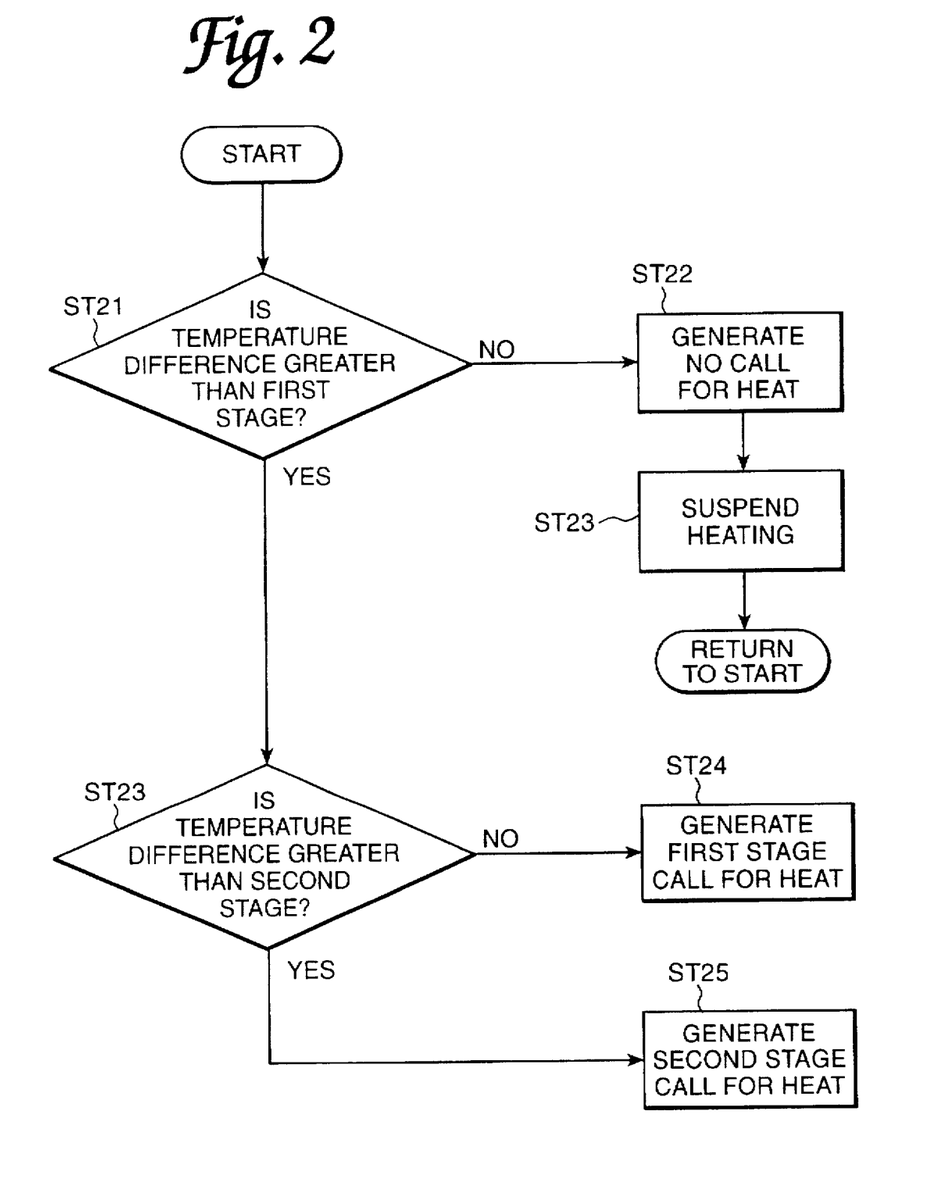
FIG. 2 is a flow chart showing a control process for responding to temperature fluctuations under an embodiment of the present invention.

FIG. 2 shows a flowchart describing the process by which calls for heat are generated by thermostat 30. In step ST21, the indoor air temperature measured by temperature sensor T4 is compared with a target room temperature indicated by thermostat 30. When the difference between the indoor space temperature and the target temperature is less than a first threshold value (FIRST STAGE, e.g., ±2° F.), no call for heat is generated by the heating system (step ST22). In such a case, the heating of indoor space 14 is suspended in step ST23 and the process returns to START to continue monitoring the system. In contrast, when the difference exceeds FIRST STAGE, the difference is compared with a second threshold value (SECOND STAGE, e.g., ±4° F.) in step ST23. A first stage call for heat is generated in step ST24 when the difference is less than the SECOND STAGE threshold value; a second stage call is generated in step ST25 when the difference is not less than the SECOND STAGE threshold value.

Figure 3:
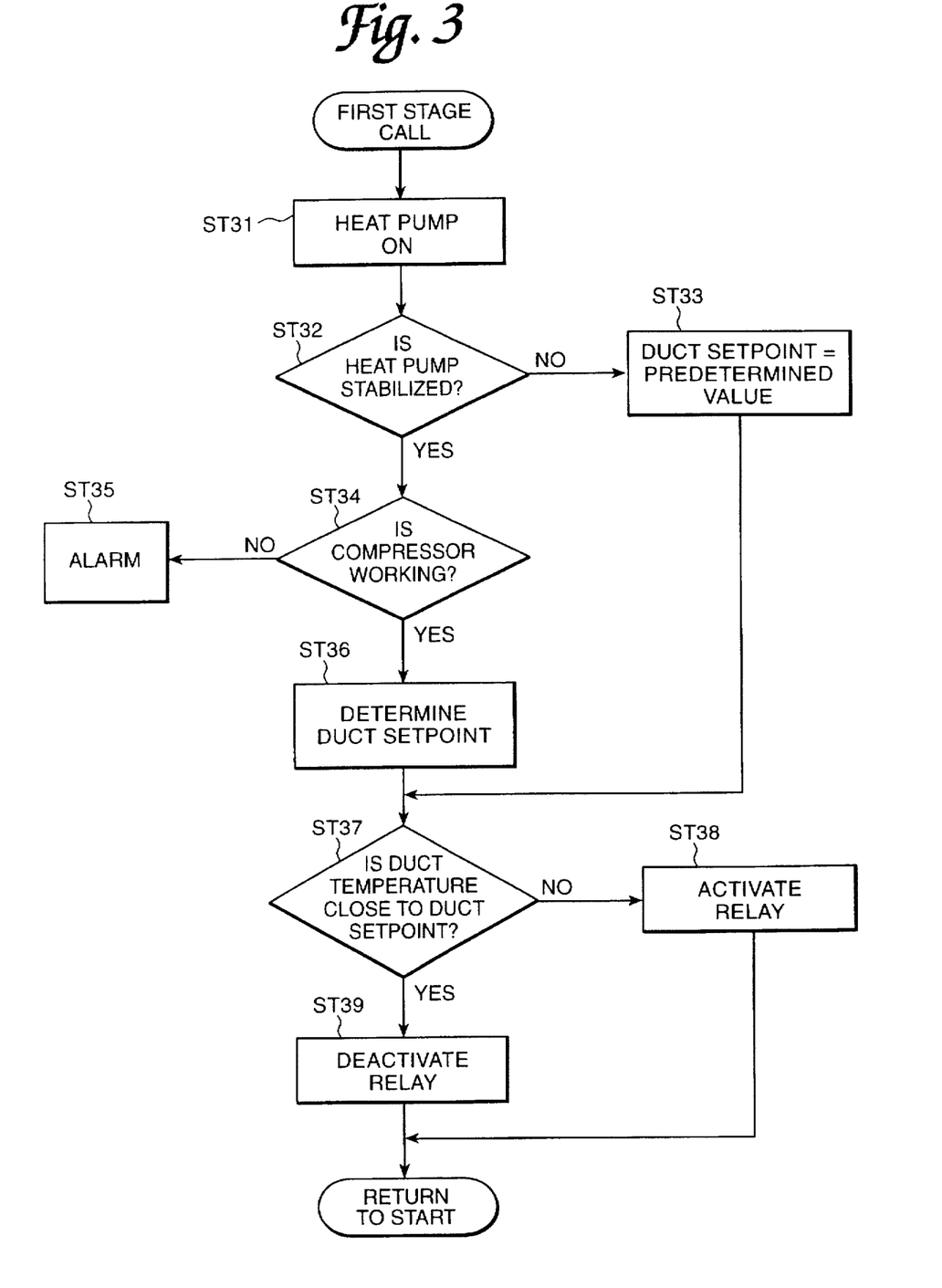
FIG. 3 is a flow chart showing a control process in response to a first stage call for heat from the thermostat.

FIG. 3 shows the operation of the heating system of the present invention as applied to a conventional heat pump system in response to a first stage call for heat. The heat pump is turned on, or maintained on, in response to a first stage call for heat from thermostat 30 (step ST31). The heat pump is then checked to determine whether it is operating stably (step ST32). Various indicators may be used to determine whether the heat pump has stabilized. For instance, the temperature of the refrigerant passed from outdoor heat exchanger 21 to inside heat exchanger 12 may be monitored, or a timer may be used to ensure passage of a predetermined amount of time typically required for stabilization (e.g., 10 minutes). When the heat pump has not stabilized, the duct temperature setpoint is set to a predetermined value (e.g., 96° F.) (step ST33).

When the heat pump has stabilized, the status of the compressor is checked (step ST34). In the preferred embodiment, the status of the compressor is checked based on a difference in temperature between refrigerant on opposite sides of the compressor. In the preferred embodiment temperature sensors T1 and T2, in lines 23 and 24, respectively, are used to determine these temperatures. The temperature difference represents the ability of the compressor to compress the refrigerant. When the difference is less than a predetermined level, e.g., ±20° F., an alarm is activated because failure to generate such a temperature difference is characteristic of problems such as a low coolant level or a clogged filter (step ST35). When the difference exceeds the predetermined level, the compressor is deemed working and the setpoint is determined by controller 15 (step ST36).

The duct temperature setpoint is related to the heat loss experienced by the indoor space being heated. The most influential factor relating to heat loss is the outside temperature since the flow of heat through a structure is primarily a function of the temperature difference across the structure. For that reason, the duct temperature setpoint is determined based on the outside air temperature.

Outside air temperature can be measured directly using an outdoor temperature sensor (see temperature sensor T5 in FIG. 1A), or indirectly based on indicators such as the temperature of refrigerant flowing from outdoor heat exchanger 21 to indoor heat exchanger 12 ("refrigerant discharge temperature"). Thus temperature sensor T2 can be used to generate a control signal related to the outdoor temperature. More specifically, the refrigerant discharge temperature is related to the outside temperature, the refrigerant discharge temperature decreasing when outside temperatures fall and increasing when the outside temperatures rise. A relationship therefore exists between the refrigerant discharge temperature at the output of outdoor heater changer 21 and the heating requirements of the structure being heated. This relationship is used to determine the appropriate duct temperature setpoint. When sensor T2 is used to generate a signal related to outdoor temperature, sensor T5 can be omitted.

A table of predetermined values is stored in storage device 16 relating duct temperature setpoints to various output values of temperature sensor T2. FIG. 8 shows a graph illustrating relationships between outdoor air temperature and each of the refrigerant discharge temperature (DT) and the duct temperature setpoint (DTS), the temperatures shown on the ordinate axis representing both refrigerant discharge temperatures and duct temperature setpoints. Using the stored table, controller 15 determines the appropriate duct temperature setpoint based on the generated value related to outdoor temperature.

The duct temperature setpoint established in either step ST33 or step ST36 is then compared to the duct temperature (step ST37). When the difference between the duct temperature and the duct temperature setpoint is greater than a predetermined error threshold (e.g., ±1° F.), relay 80 is activated and supplemental heat is generated (step ST38). In the illustrated embodiment, activation of relay 80 energizes one heater 90 in supplemental heater package 11. However, because the available heat pump output is inherently related to the ability/inability of the heat pump to produce the required amount of heat, it can also be used to determine a specific amount of supplemental heat needed to achieve the duct temperature setpoint. Using the available heat pump output to determine the amount of supplemental heat required, more sophisticated control of the supplemental heaters can be obtained via relay or relays 80 in step ST38. Thus, one of ordinary skill can appreciate application of the above to more than one heater 90 within supplemental heater package 11 to supplement the heat generated by the heat pump system in response to a first stage call, the number of heaters being based on factors such as the difference between the duct temperature and the duct temperature setpoint, the number of passes through the first stage call routine, or the like.

When the difference between the duct temperature and the duct temperature setpoint is less than the predetermined error threshold, relay 80 is deactivated because supplemental heat is not necessary (step ST39). The process then returns to START in FIG. 2.

Figure 4:
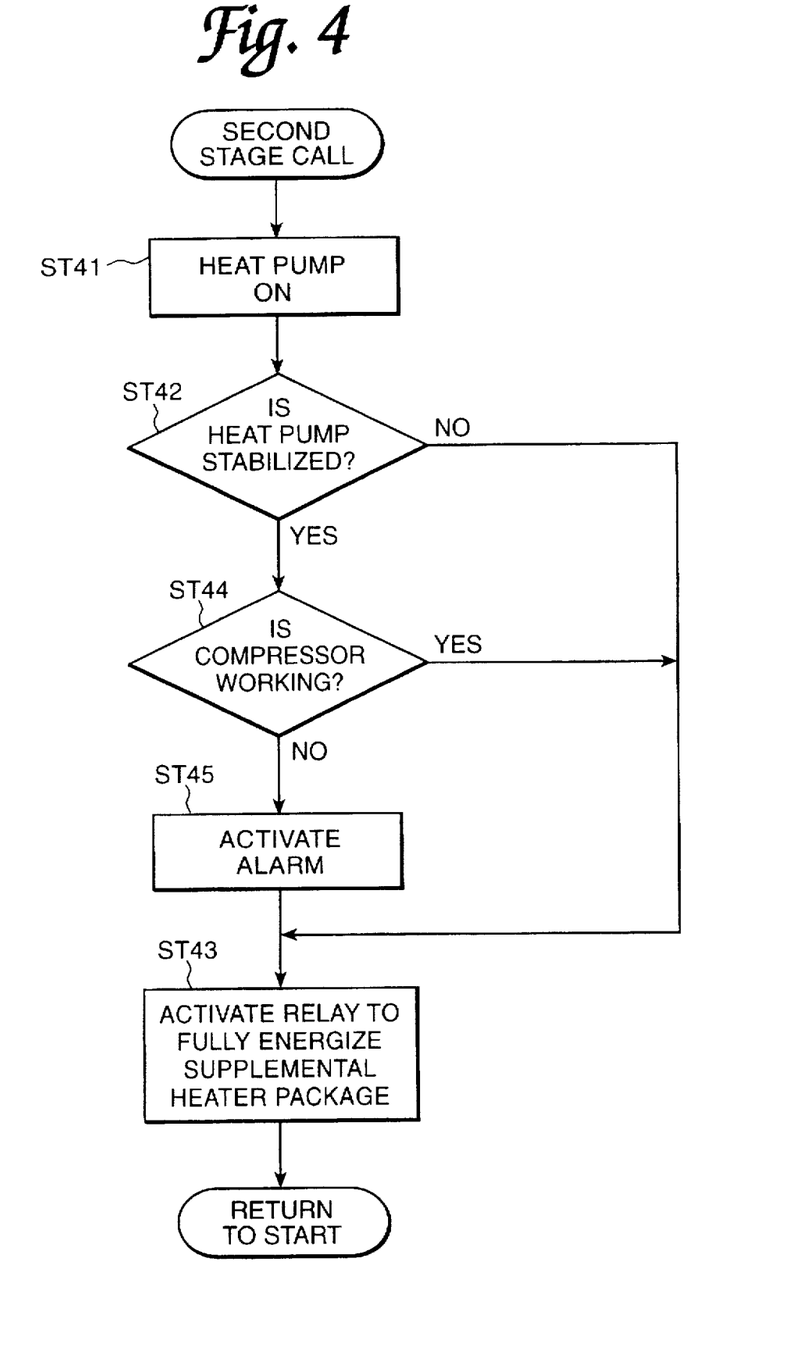
FIG. 4 is a flow chart showing a control process in response to a second stage call for heat from the thermostat.

FIG. 4 shows the operation of the heating system in response to a second stage call for heat. In response to a second stage call from thermostat 30, the heat pump is turned on, or maintained on if previously activated (step ST41). The stability of the heat pump is then checked to determine whether the heat pump is operating stably (step ST42). When the heat pump is stabilized, the status of the compressor is checked as described with regard to step ST34 (step ST44). When the compressor is not working properly, an alarm is activated (step ST45).

After steps ST42, ST44 and ST45, whether or not the heat pump has stabilized and whether or not the compressor is working properly, relay 80 is activated to fully energize supplemental heater package 11 in step ST43 under three conditions. After activation of relay 80 in step ST43, the process is returned to START. Of course, other control patterns are possible. For example, if it is determined that the compressor is not working, relay 80 may not be energized.

Figure 5:
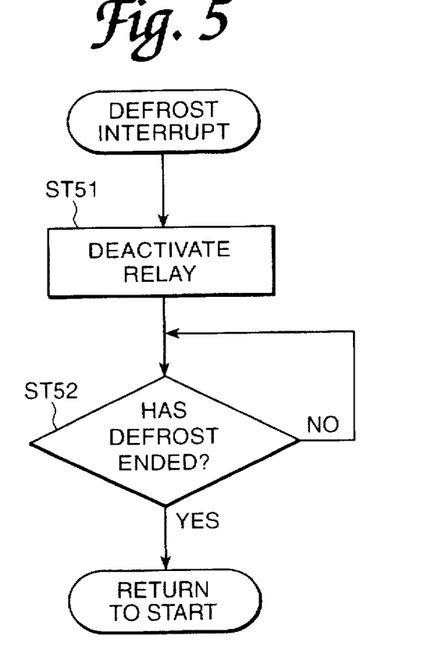
FIG. 5 is a flow chart showing a control process performed upon receipt of a defrost signal from the heat pump.
Figure 6:
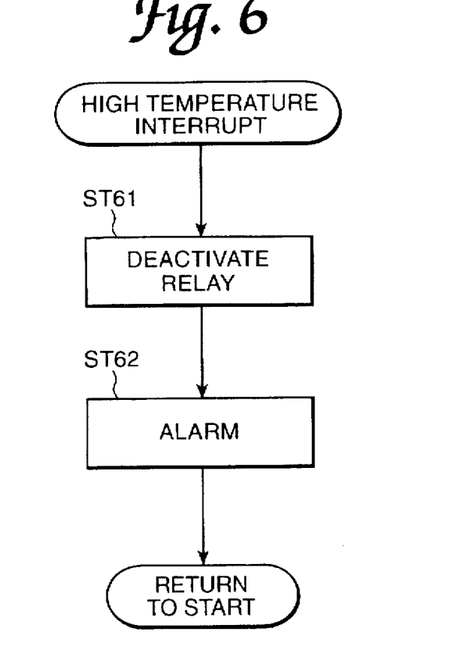
FIG. 6 is a flow chart showing a control process performed in response to a high temperature interrupt.

FIGS. 5–6 are interrupt routines that are performed upon the occurrence of certain specific events.

Heat pumps must periodically be defrosted. Some heat pumps detect ice build-up and perform a defrost cycle as needed. Other heat pumps perform a defrost cycle at periodic intervals. FIG. 5 is an interrupt routine that is performed by controller 15 during the heat pump defrost process. In step ST51, controller 15 deactivates relay 80. Step ST52 represents a delay used to ensure that the defrost process is completed before control is returned to START in FIG. 2, where a call for heat is initiated when appropriate. Therefore, during defrost, control of supplemental heater package 11 is not performed by controller 15.

The heating system of the present invention also monitors temperature sensor T3 located in distribution duct 13. If the temperature detected by sensor T3 exceeds a predetermined threshold (e.g., 150° F.), the high temperature interrupt of FIG. 6 is initiated. In step ST61, the relays controlled by controller 15 are deactivated to reduce the high temperature that has been detected. At step S62, an alarm is generated, after which time control is returned to START in FIG. 2 for further processing if appropriate.

Figure 7:
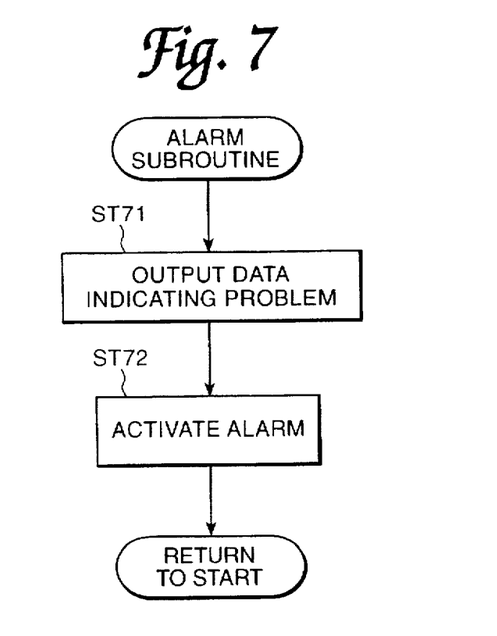
FIG. 7 is a flow chart showing an alarm control process performed to indicate system malfunction.

FIG. 7 shows a flowchart describing the alarm subroutine which is called from step ST35 in FIG. 3, step ST45 in FIG. 4 or step ST62 in FIG. 6. In step S71 of the alarm subroutine, controller 15 generates and outputs a signal indicating the problem giving rise to the alarm interrupt. At step ST72, controller 15 activates appropriate alarms such as audio and visual alarms for an appropriate amount of time, e.g., for ten seconds every minute for an hour. The present invention also contemplates the use of remote alert systems that inform the remote homeowner or local authorities of the problems giving rise to the alarm.

A number of variations to the above-described preferred embodiment are also contemplated. For example, additional sensors can be added to provide direct indications of additional factors that impact the heat loss experienced by the indoor space being heated such as indoor lighting, wind, and solar effects. A predetermined table of values can also be added to determine duct temperature setpoint based on those factors.

This system can also be adapted to apply to systems having primary heat via means other than a heat pump, e.g. furnace driven systems. In such systems, controller 15 generates a control signal based on the temperature of air flowing through a return air duct. The return air duct temperature can be used as an indicator of the heat loss experienced by the indoor space being heated since the difference between the return air duct temperature and the desired room temperature results from that heat loss.

Additionally, instead of the above-described retrofitted embodiment, the present invention can be integrated into new heating systems. Such a system could use controller 15 to control both the primary heat source and the secondary heat source throughout the heating process.

While the embodiments of present invention which are presently preferred have been illustrated and described, it will be understood by those skilled in the art that various additional changes and modifications may be made, and equivalents may be substituted for elements thereof without departing from the true scope of the present invention. In addition, many modifications may be made to adapt a particular situation to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

What is claimed is:

1. A method for heating an area, comprising the steps of:
   heating air using a primary heat source when a difference between a target temperature and an actual temperature in said area exceeds a first predetermined threshold value;
   generating a control signal related to outside temperature;
   determining a setpoint temperature for heated air flowing between said primary heat source and said area being heated, said temperature setpoint being based on said control signal;
   measuring a temperature of said heated air flowing between said primary heat source and said area being heated; and
   supplementally heating said air using a supplemental heat source when a difference between said measured air temperature and said setpoint temperature exceeds a second predetermined threshold value.

2. The method according to claim 1, wherein an amount of heat generated by said supplemental heat source is determined based on said difference between said measured air temperature and said setpoint temperature.

3. The method according to claim 1, wherein said primary heat source is a heat pump having indoor and outdoor heat exchangers.

4. The method according to claim 3, wherein said control signal generating step includes the step of determining a temperature of refrigerant flowing from said outdoor heat exchanger to said indoor heat exchanger.

5. The method according to claim 1, wherein said control signal generating step includes the step of measuring an outside air temperature using an outside temperature detector.

6. The method according to claim 3, further including the steps of:
   measuring a first temperature associated with refrigerant upstream a compressor of said heat pump;
   measuring a second temperature associated with refrigerant downstream said compressor; and
   activating an alarm when a difference between said first temperature and said second temperature is less than a predetermined amount.

7. The method according to claim 1, wherein said primary heat source is a furnace having a return air duct.

8. The method according to claim 7, wherein said control signal generating step includes the step of generating said control signal based on a temperature of air passing through said return air duct.

9. The method according to claim 1, wherein said supplemental heating is performed by only a limited portion of said supplemental heat source when said difference between said target temperature and said actual temperature is less than a third predetermined threshold value, said third predetermined threshold value being greater than said first predetermined threshold value.

10. The method according to claim 9, further including the step of supplementally heating said air using the full capabilities of said supplemental heat source when said difference between said target temperature and said actual temperature exceeds said third predetermined threshold value.

11. The method according to claim 1, further including the steps of deactivating said supplemental heat source and activating an alarm when said temperature measured in said measuring step exceeds a predetermined amount.

12. The method according to claim 3, further including the steps of deactivating said supplemental heat source when said heat pump is performing a defrost operation.

13. A heating system, comprising:

a primary heat source heating air when a difference between a target temperature and an actual temperature in said area exceeds a first predetermined threshold value;

a control signal circuit generating a control signal related to outside temperature;

a circuit for determining a setpoint temperature for heated air flowing between said primary heat source and said area being heated, said temperature setpoint being based on said control signal;

a temperature sensor measuring a temperature of said heated air flowing between said primary heat source and said area being heated; and a supplemental heat source supplementally heating said heated air when a difference between said measured air temperature and said setpoint temperature exceeds a second predetermined threshold value.

14. The heating system according to claim 13, wherein an amount of heat generated by said supplemental heat source is determined based on said difference between said measured air temperature and said setpoint temperature.

15. The heating system according to claim 13, wherein said primary heat source is a heat pump having indoor and outdoor heat exchangers.

16. The heating system according to claim 15, wherein said control signal circuit includes a device which measures a temperature of refrigerant flowing from said outdoor heat exchanger to said indoor heat exchanger.

17. The heating system according to claim 13, further including a temperature sensor for measuring a temperature of outside air, wherein said control signal circuit generates said control signal based on said measured outside air temperature.

18. The heating system according to claim 15, wherein said heat pump includes a compressor, said heating system further including:

a temperature sensor measuring a first temperature associated with refrigerant upstream said compressor;

a temperature sensor measuring a second temperature associated with refrigerant downstream said compressor; and an alarm activating when a difference between said first temperature and said second temperature is less than a predetermined amount.

19. The heating system according to claim 13, wherein said primary heat source is a furnace having a return air duct.

20. The heating system according to claim 19, wherein said control signal circuit includes a device which measures a temperature of air passing through said return air duct.

21. The heating system according to claim 13, further including an activating circuit which activates only a limited portion of said supplemental heat source when said difference between said target temperature and said actual temperature is less than a third predetermined threshold value, said third predetermined threshold value being greater than said first predetermined threshold value.

22. The heating system according to claim 21, wherein said activating circuit fully activates said supplemental heat source when said difference between said target temperature and said actual temperature exceeds said third predetermined threshold value.

23. The heating system according to claim 13, further including a circuit deactivating said supplemental heat source when said temperature measured by said temperature sensor exceeds a predetermined amount.

24. The heating system according to claim 15, further including a circuit deactivating said supplemental heat source when said heat pump is performing a defrost operation.

25. A method for heating an area, comprising the steps of:

heating air using a primary heat source when a difference between a target temperature and an actual temperature in said area exceeds a first predetermined threshold value;

generating a control signal related to outside temperature;

determining a setpoint temperature for heated air flowing between said primary heat source and said area being heated, said temperature setpoint being based on said control signal;

measuring a temperature of said heated air flowing between said primary heat source and said area being heated;

supplementally heating said air using a supplemental heater when a difference between said measured air temperature and said setpoint temperature exceeds a second predetermined threshold value, said supplemental heater operating at less than full capacity when said difference between said target temperature and said actual temperature in said area is less than a third predetermined threshold value, said third predetermined threshold value being greater than said first predetermined threshold value.

26. The method according to claim 25, wherein said supplementally heating step includes the step of increasing an output of said supplemental heat source when said difference between said target temperature and said actual temperature in said area exceeds said third predetermined threshold value.

27. The method according to claim 25, wherein said step of supplementally heating includes the step of driving the entire supplemental heat source at less than full capacity when said difference between said target temperature and said actual temperature in said area is less than said third predetermined threshold value.

28. The method according to claim 25, wherein an amount of heat generated by said supplemental heat source is determined based on said difference between said measured air temperature and said setpoint temperature.

29. The method according to claim 25, wherein said primary heat source is a heat pump having indoor and outdoor heat exchangers.

30. The method according to claim 29, wherein said control signal generating step includes the step of determining a temperature of refrigerant flowing from said outdoor heat exchanger to said indoor heat exchanger.

31. The method according to claim 25, wherein said control signal generating step includes the step of measuring an outside air temperature using an outside temperature detector.

32. The method according to claim 29, further including the steps of:
  measuring a first temperature associated with refrigerant at an output from said outside heat exchanger;
  measuring a second temperature associated with refrigerant at an input to said outside heat exchanger; and
  activating an alarm when a difference between said first temperature and said second temperature is less than a predetermined amount.

33. The method according to claim 25, wherein said primary heat source is a furnace having a return air duct.

34. The method according to claim 33, wherein said control signal generating step includes the step of determining a temperature of air passing through said return air duct.

35. The method according to claim 25, further including the steps of deactivating said supplemental heat source and activating an alarm when said temperature measured in said measuring step exceeds a predetermined amount.

36. The method according to claim 25, further including the steps of deactivating said supplemental heat source when said heat pump is performing a defrost operation.

* * * * *